US010322664B2

(12) United States Patent
Dill

(10) Patent No.: US 10,322,664 B2
(45) Date of Patent: Jun. 18, 2019

(54) AIR FLAP APPARATUS HAVING INTEGRATED LIGHT GUIDES FOR A MOTOR VEHICLE

(71) Applicant: Röchling Automotive SE & Co. KG, Mannheim (DE)

(72) Inventor: Peter Dill, Ingolstadt (DE)

(73) Assignee: Röchling Automotive SE & Co. KG, Mannheim (DE)

( * ) Notice: Subject to any disclaimer, the term of this patent is extended or adjusted under 35 U.S.C. 154(b) by 0 days.

(21) Appl. No.: 16/123,507

(22) Filed: Sep. 6, 2018

(65) Prior Publication Data

US 2019/0077298 A1 Mar. 14, 2019

(30) Foreign Application Priority Data

Sep. 11, 2017 (DE) .................... 10 2017 215 989

(51) Int. Cl.
*B60K 11/08* (2006.01)
*B60Q 1/00* (2006.01)
(Continued)

(52) U.S. Cl.
CPC .......... *B60Q 1/0011* (2013.01); *B60K 11/085* (2013.01); *B60Q 1/0035* (2013.01);
(Continued)

(58) Field of Classification Search
CPC .............................. B60K 11/08; B60K 11/085
(Continued)

(56) References Cited

U.S. PATENT DOCUMENTS 6,854,544 B2 * 2/2005 Vide .................... B60K 11/085
180/68.1
6,986,597 B2 * 1/2006 Elwell .................. B60Q 1/2661
362/496

(Continued)

FOREIGN PATENT DOCUMENTS

DE  10 2006 017 780 A1   10/2007
DE  10 2007 018 678 A1   10/2008
(Continued)

OTHER PUBLICATIONS

German Search Report for corresponding DE 10 2017 215 989.8 dated Jun. 14, 2018, 8 pgs.
(Continued)

*Primary Examiner* — Jeffrey J Restifo
(74) *Attorney, Agent, or Firm* — Rankin, Hill & Clark LLP

(57) ABSTRACT

An air flap apparatus for a motor vehicle encompasses a frame having a flowthrough opening, on which frame at least one air flap is mounted movably relative to the frame, protrudingly into the flowthrough opening or penetratingly therethrough, the at least one air flap being displaceable between a closed position and an open position in order to modify a gas quantity flowing per unit time through the flowthrough opening in the context of a predefined impinging flow, the at least one air flap decreasing a flowthrough-capable cross section of the flowthrough opening more greatly in the closed position than in the open position, the air flap apparatus further encompassing a movement drive system that is coupled in movement- and force-transferring fashion to the at least one air flap in order to drive the at least one air flap to move between the closed position and the open position, at least one air flap constituting a light-emitting air flap including a flap light guide having a light
(Continued)

emergence surface through which light transferred in the flap light guide can emerge to the external environment of the light-emitting air flap.

20 Claims, 3 Drawing Sheets

(51) Int. Cl.
*F16H 21/44* (2006.01)
*F16H 25/20* (2006.01)

(52) U.S. Cl.
CPC .............. *F16H 21/44* (2013.01); *F16H 25/20* (2013.01); *F16H 2025/2043* (2013.01)

(58) Field of Classification Search
USPC .................. 180/68.1, 68.4, 68.3; 296/193.1; 362/547
See application file for complete search history.

(56) References Cited

U.S. PATENT DOCUMENTS

| | | | | |
|---|---|---|---|---|
| 7,182,398 B2* | 2/2007 | Lin | ...................... | B60Q 1/2661 |
| | | | | 293/115 |
| 7,498,926 B2* | 3/2009 | Browne | ............... | B60K 11/085 |
| | | | | 123/41.06 |
| 8,025,045 B2* | 9/2011 | Pettersson | .............. | B60K 11/04 |
| | | | | 123/41.59 |
| 8,161,919 B2* | 4/2012 | Klotz | ................... | B60K 11/085 |
| | | | | 123/41.04 |
| 8,371,732 B2* | 2/2013 | Charnesky | ........... | B60Q 1/2661 |
| | | | | 296/193.09 |
| 8,430,195 B2* | 4/2013 | Jansen | ................... | B62D 25/10 |
| | | | | 180/69.2 |
| 8,469,128 B2* | 6/2013 | Van Buren | ........... | B60K 11/085 |
| | | | | 165/44 |
| 8,473,164 B2* | 6/2013 | Charnesky | ........... | B60K 11/085 |
| | | | | 123/41.04 |
| 8,505,660 B2* | 8/2013 | Fenchak | .............. | B60K 11/085 |
| | | | | 180/68.1 |
| 8,561,738 B2* | 10/2013 | Charnesky | ........... | B60K 11/085 |
| | | | | 180/68.1 |
| 8,645,028 B2* | 2/2014 | Mochizuki | ........... | B60K 11/085 |
| | | | | 123/41.05 |
| 8,689,917 B2* | 4/2014 | Miesterfeld | ............... | F01P 7/10 |
| | | | | 180/68.1 |
| 8,708,078 B2* | 4/2014 | Charnesky | ........... | B60K 11/085 |
| | | | | 180/68.4 |
| 8,720,624 B2* | 5/2014 | Remy | .................. | B60K 11/085 |
| | | | | 180/68.1 |
| 8,833,498 B2* | 9/2014 | Charnesky | ................ | F01P 7/10 |
| | | | | 180/68.1 |
| 9,045,076 B2* | 6/2015 | Rupar | .................. | B60Q 1/0052 |
| 9,365,106 B2* | 6/2016 | Bruckner | ............. | B60K 11/085 |
| 9,599,050 B2* | 3/2017 | Sugimoto | ................ | F01P 11/14 |
| 9,975,421 B2* | 5/2018 | Froling | .................. | B60K 11/04 |
| 9,994,100 B1* | 6/2018 | Del Gaizo | ............. | B60K 11/04 |
| 10,017,048 B2* | 7/2018 | Manhire | ............. | B60K 11/085 |
| 2006/0114686 A1* | 6/2006 | Liu | ...................... | B60Q 1/2661 |
| | | | | 362/496 |
| 2016/0363035 A1* | 12/2016 | Solazzo | .................... | F01P 7/10 |

FOREIGN PATENT DOCUMENTS

| | | |
|---|---|---|
| DE | 10 2008 013 422 A1 | 9/2009 |
| DE | 10 2009 039 038 A1 | 3/2011 |
| GB | 2 515 642 A | 12/2014 |

OTHER PUBLICATIONS

Espacenet Bibliographic data: DE 102006017780(A1), Published Oct. 31, 2007, 1pg.
Espacenet Bibliographic data: DE 102007018678(A1), Published Oct. 23, 2008, 1pg.
Espacenet Bibliographic data: DE 102008013422(A1), Published Sep. 17, 2009, 1pg.
Espacenet Bibliographic data: DE 102009039038(A1), Published Mar. 3, 2011, 1pg.

* cited by examiner

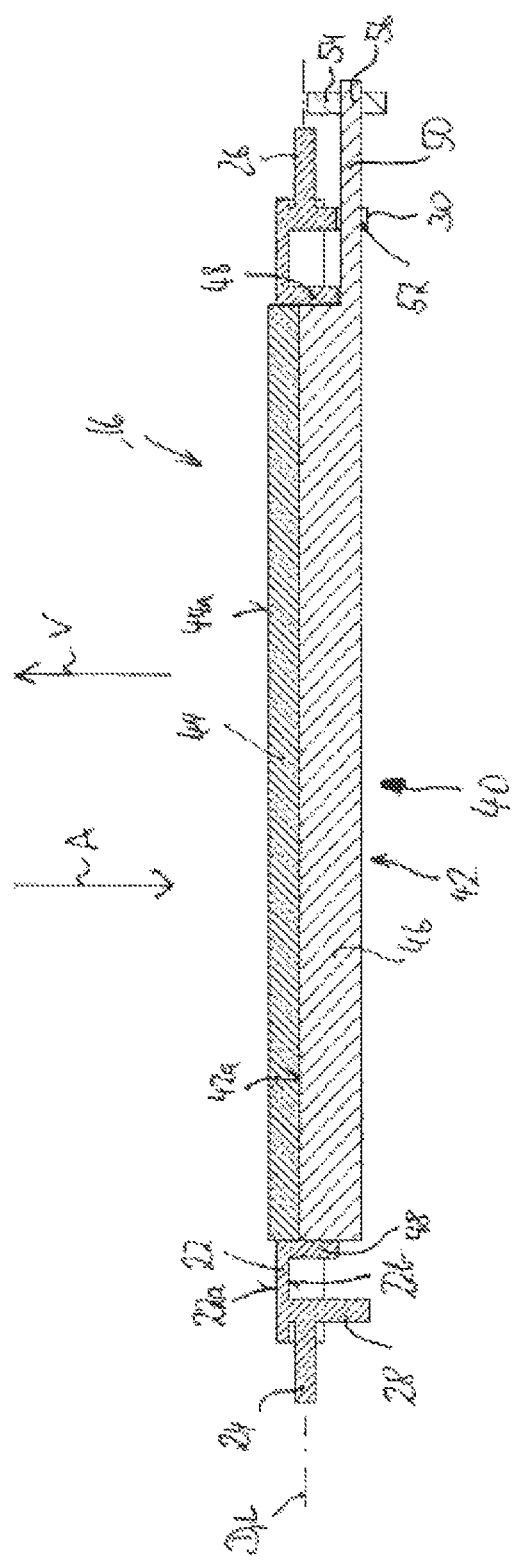

AIR FLAP APPARATUS HAVING INTEGRATED LIGHT GUIDES FOR A MOTOR VEHICLE

The present invention relates to an air flap apparatus for a motor vehicle. The air flap apparatus encompasses a frame having a flowthrough opening, on which frame at least one air flap is mounted movably relative to the frame, protrudingly into the flowthrough opening or penetratingly therethrough, when viewed in an operationally intended impinging flow direction, the at least one air flap being displaceable between a closed position and an open position in order to modify a gas quantity flowing per unit time through the flowthrough opening in the context of a predefined impinging flow, the at least one air flap decreasing a flowthrough-capable cross section of the flowthrough opening more greatly in the closed position than in the open position, the air flap apparatus further encompassing a movement drive system that is coupled in movement- and force-transferring fashion to the at least one air flap in order to drive the at least one air flap to move between the closed position and the open position.

BACKGROUND OF THE INVENTION

An air flap apparatus of this species is known, for example, from DE 10 2015 210 683 A1 or also from DE 10 2008 013 422 A1. Air flap apparatuses of the kind recited previously serve on a motor vehicle, as a rule, to make the flowthrough opening flowthrough-capable for convective cooling air to flow through, by corresponding displacement of the at least one air flap between the open position and closed position, or to block it for such a flow.

Air flap apparatuses of this kind are usually arranged at the front side of a motor vehicle, where they are impinged upon by a flow of wind blast as the motor vehicle carrying the air flap apparatus travels forward. The wind blast can then constitute the aforesaid convective cooling air that can impinge, through the flowthrough opening, on accessories located behind the flowthrough opening in a flowthrough direction, in order to cool them. For example, a heat exchanger for an operating fluid of the motor vehicle, for example for a cooling fluid or for a lubricant, can be arranged behind the flowthrough opening and behind the at least one air flap in the flowthrough direction.

A fan that, when the travel speed of the motor vehicle carrying the air flap apparatus is not sufficient for sufficient convective cooling, draws air through the flowthrough opening when the flowthrough opening is open and blows it in turn into accessories to be convectively cooled, in particular through the heat exchanger, can also be arranged in the vicinity of the flowthrough opening, usually behind the flowthrough opening and behind the air flap in the flowthrough direction.

Air flap apparatuses of this kind, in particular for arrangement on the front side of a motor vehicle, are commonly known by way of the aforementioned exemplifying documents.

SUMMARY OF THE INVENTION

An object of the present invention is to refine the air flap apparatus recited initially in such a way that the operating position in which it is located is detectable, even in darkness, from outside the vehicle carrying the air flap apparatus.

This object is achieved according to the present invention by an air flap apparatus of the kind recited initially in which at least one air flap of the air flap apparatus, constituting a light-emitting air flap, comprises a flap light guide having a light emergence surface through which light transferred in the flap light guide can emerge to the external environment of the light-emitting air flap.

The reason is that when light can emerge or radiate through the flap light guide of the light-emitting air flap to the external environment of the light-emitting air flap, the light is perceptible from outside the air flap apparatus. Because the flap light guide is provided on the light-emitting air flap, it is displaced together with the light-emitting air flap between its operating positions (closed position and open position), perception of the light emerging through the light emergence surface being perceived by the observer, for a substantially constant observer position, differently when the light-emitting air flap is in different operating positions. The respective position of the light-emitting air flap can thus be detected even in the complete absence of external light sources.

"Light guides" for purposes of the present Application are components that are transparent at least in a light-guiding direction and are capable, because of their physical configuration, of guiding light in the light-guiding direction because, as a result of refractive indices of materials used in the light guide, light propagating in the light guide is reflected at the boundary surface of the light guide back into the light guide and thus can leave the light guide predominantly, preferably only, through the light emergence surface. The light yield at the light emergence surface is thus very high, which allows lower-output light sources to be used in order to introduce light into the flap light guide.

It is possible in principle to arrange the light source directly on the light-emitting air flap. It is always desirable to minimize moving mass, however, and this also applies to the light-emitting air flap. The capability of arranging a light source for introducing light into the flap light guide remotely from the light-emitting flap can be achieved by the fact that a frame light guide, which is coupled in light-transferring fashion to the flap light guide of the at least one light-emitting air flap, is retained on the frame. Light can thus be transferred via the frame light guide of the frame to the flap light guide of the at least one light-emitting air flap.

For light transfer between the frame light guide and flap light guide, according to an advantageous refinement of the present invention provision can be made that the flap light guide of the light-emitting air flap comprises an optical coupling segment that is coupled in light-transferring fashion to a counterpart optical coupling segment of the frame light guide. For example, a segment of the flap light guide, constituting an optical coupling segment, can pass through or project into a segment of the frame light guide constituting a counterpart optical coupling segment.

The frame light guide can then comprise, at a distance from the counterpart optical coupling segment, an introduction segment that is embodied for introduction of light into the frame light guide. That introduction segment can in turn be coupled to a further light guide or directly to a light source.

In order to allow an air flap apparatus to be furnished as a subassembly operationally ready for installation on a vehicle, according to an advantageous refinement of the present invention provision is made that it comprises a light source that is in light-transferring communication with the frame light guide in such a way that light emitted from the light source is transferrable or transferred by the frame light guide. Preferably the light source comprises at least one LED, which advantageously requires little installation space and has a high light output in terms of the energy delivered to it. The light source can of course comprise several LEDs, for example so that different emitted light colors and/or color temperatures and/or a greater light intensity can be furnished. The light source can be provided on the frame, for example in a chamber provided therefor and closed off on several sides, so that the light proceeding from the light source is if possible admitted only into the frame light guide and is not disruptive as scattered light.

The air flap apparatus as a rule will encompass a plurality of air flaps that usually are arranged parallel to one another. It is possible in principle to displace the air flaps along any desired movement path between their open position and their closed position. Preferably, however, the air flaps are displaced between their open position and their closed position rotatingly, in a manner that reduces installation space and movement space, by way of a rotational movement around an air flap rotation axis that extends parallel to their longitudinal axis.

It is in turn advantageous for this purpose to couple the plurality of air flaps by way of a coupling component, for example a connecting strut, for movement together between the open position and closed position. Thus it is either sufficient to drive the strut to move in order to allow all, or a group made up of a plurality of, the air flaps simultaneously between the same operating positions, or it is sufficient to couple one of the air flaps directly to the movement drive system and to couple the remaining air flaps indirectly to the movement drive system via the connecting strut. This consistently enables a synchronous movement of the plurality of mutually coupled air flaps.

Preferably the air flap apparatus of the present invention comprises not only several air flaps, but several light-emitting air flaps that are embodied substantially identically. In that case the air flap apparatus can be manufactured with the lowest possible parts count if a frame light guide is coupled to the flap light guides of several light-emitting air flaps. What has been stated above regarding the flap light guides of the at least one air flap is applicable to the configuration of the light-transferring coupling between the frame light guide and the several flap light guides.

The parts count necessary for manufacture of the air flap apparatus can furthermore be minimized if the frame light guide, which is in any case coupled in light-transferring fashion to a plurality of flap light guides, also contributes to coupling of the plurality of light-emitting air flaps for movement together between their operating positions (closed position and open position). The frame light guide thus can be part of a coupling component that couples the plurality of light-emitting air flaps for movement together, or can itself be the coupling component. The latter is possible in particular when, as already presented above, a positively engaging but relatively movable connection between the flap light guides and the frame light guide exists in order to constitute the light-transferring coupling between the frame light guide and the flap light guides. Such a connection can be constituted, for example, by the fact that one coupling segment from among the optical coupling segment and counterpart optical coupling segment is a cylindrical or conical peg that engages into an associated cylindrical or negatively conical recess constituting a part of the respective other coupling segment. The respective flap light guide can then be rotatable around the cylinder axis or cone axis, but is coupled in positively engaging fashion to the frame light guide in two spatial directions that extend orthogonally to the cylinder axis or cone axis.

In order for light to be radiated from the light-emitting air flap perceptibly over the largest possible spatial region in the external environment of the light-emitting air flap, the at least one light-emitting air flap can comprise an optical diffuser apparatus that is coupled in light-transferring fashion to the light emergence surface of the flap light guide. The optical diffuser apparatus then diffuses the light, transferred to it from the light emergence surface of the flap light guide, in a predetermined spatial region depending on its physical configuration.

In principle, the flap light guide can be arranged arbitrarily on the light-emitting air flap that carries it. For particularly reliable arrangement of the flap light guide on the light-emitting air flap, and for particularly defined radiation of light to the external environment, the at least one light-emitting air flap advantageously encompasses, on its front side impinged upon by flow during operation as intended, an aperture through which light is radiatable from the flap light guide to the external environment of the light-emitting air flap. Preferably, either the flap light guide with its emergence segment comprising the light emergence surface, or the diffusion apparatus coupled in light-transferring fashion to the flap light guide, is arranged in the aperture.

The aperture can have any conformation. It can be a point-shaped aperture, can comprise a series of interrupted sub-apertures, or can also be embodied, for example, in slit-shaped fashion as an aperture resembling an oblong hole.

Since it cannot ever be entirely excluded that, with light guides, a certain quantity of scattered light emerges at locations not actually intended for light emergence, provision can be made that, in order to avoid disruptive or irritating scattered light, the at least one light-emitting air flap comprises, on its rear side located oppositely from the front side impinged upon by flow during operation as intended, an enclosure that at least partly, preferably completely, covers, on at least two, preferably on more than two sides, the flap light guide and/or a diffuser apparatus coupled in light-transferring fashion thereto. The enclosure is preferably light-tight and thereby shields the flap light guide and/or the optical diffuser apparatus partly or completely on those sides toward which even slight light emission is undesired. It is thereby possible to prevent light from emerging through gaps in the flowthrough opening formed undesirably between adjacent air flaps in the open position.

In addition to the air flaps, and in particular light-emitting air flaps, movable relative to the frame, the air flap apparatus can comprise a plurality of flow-directing surfaces that are mounted on the frame immovably relative thereto. Like the plurality of light-emitting air flaps, the flow-directing surfaces also project into or pass through the flowthrough opening. Preferably the flow-directing surfaces each extend along a longitudinal axis, the longitudinal axes of the flow-directing surfaces being parallel to the longitudinal axes of the light-emitting air flaps or of the air flaps in total. Individual or several flow-directing surfaces can also be equipped, in the manner described above, with a directing-surface light guide that once again radiates light from the flow-directing surface to the external environment of the air flap apparatus, in particular through an aperture in the flow-directing surface. A light source separate from the light source of the light-emitting flaps can be provided for light emission through the directing-surface light guides, in order to make the flow-directing surfaces distinguishable from the light-emitting air flaps in terms of light-emission optics. For example, the flow-directing surfaces can emit through their directing-surface light guides a differently colored light than the light-emitting air flaps, and/or can emit with greater or less light intensity. One and the same light source can, however, also be used to supply both the flap light guides and the directing-surface light guides.

The directing-surface light guides of the flow-directing surfaces can also be connected in light-transferring fashion via a common connecting light guide, so that a single light source is sufficient for several or all flow-directing surfaces. Because the flow-directing surfaces are provided immovably on the frame, a relative movement between the connecting light guide and directing-surface light guide is unnecessary. It is therefore even conceivable to embody the connecting light guide and the directing-surface light guides in one piece.

In principle, the light-emitting air flaps and/or the light-emitting flow-directing surfaces can emit light continuously, for example as soon as the vehicle's ignition has been actuated or a corresponding power supply of the vehicle carrying the air flap apparatus has been activated. In order to inform the external environment regarding the actuation or the operating state of the air flap apparatus, however, it can be advantageous if the air flap apparatus comprises a control apparatus that is embodied to control both the operation of the movement drive system and the operation of the light source. The control apparatus can then be embodied to operate the at least one light source as a function of the operating state of the movement drive system. For example, the at least one light-emitting air flap and/or the at least one light-emitting flow-directing surface can emit brighter or less-bright light when the movement drive system is currently active and the light-emitting air flaps are changing their relative position relative to the frame. Alternatively or additionally, the light color emitted by the light-emitting air flaps and/or the light-emitting flow-directing surfaces can change while the movement drive system is operating. It is likewise conceivable for the light emission of the light-emitting air flaps and/or light-emitting flow-directing surfaces to be emitted continuously as continuous light when the light-emitting air flaps are at a standstill relative to the frame, while it is emitted intermittently during movement of the light-emitting air flaps relative to the frame.

In simple and compact fashion, the control apparatus can be received together with the movement drive system in one housing. Preferably the control apparatus and the movement drive system are embodied as a combined controller/actuator subassembly. The air flap apparatus can thereby be furnished as a functionally ready preassembled subassembly, and installed on a motor vehicle.

The present invention also relates to a motor vehicle having an air flap apparatus as described above, such that a front side of the at least one light-emitting air flap, which side is impinged upon by wind blast in the closed position when the motor vehicle is traveling forward, faces in the forward travel direction in the closed position.

These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein:

FIG. 3 is a schematic longitudinal section view of a light-emitting air flap of the air flap apparatus of FIGS. 1 and 2.

Be it noted expressly that the Figures for the present Application are not accurately to scale, nor do they accurately depict a relative movement of air flaps relative to the frame. The Figures serve merely to illustrate the principle of the present invention and are correspondingly schematic in nature.

DESCRIPTION OF PREFERRED EMBODIMENTS

Figure 1:
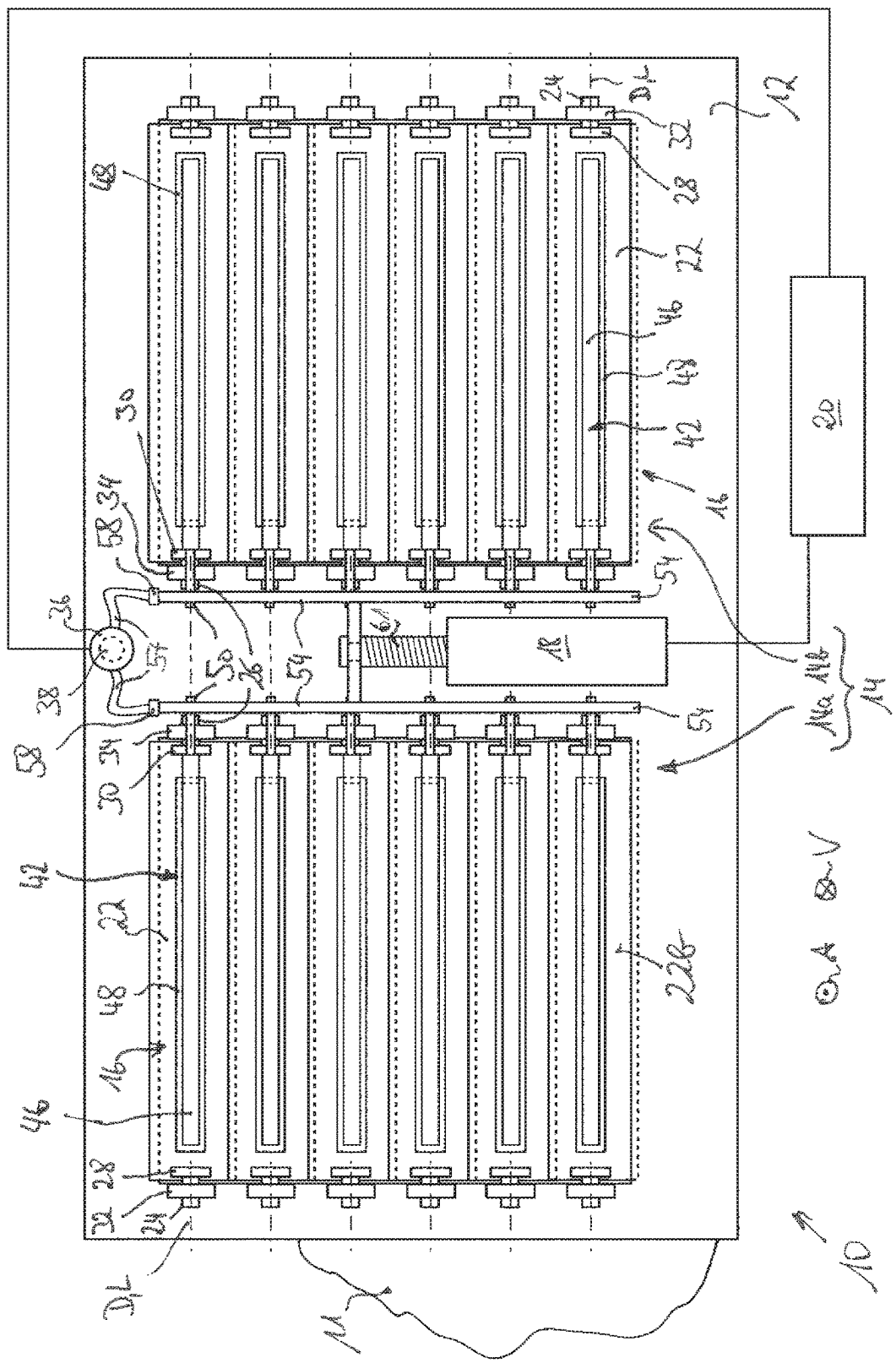
FIG. 1 is a schematic plan view of an embodiment according to the present invention of an air flap apparatus of the present Application, looking toward the rear side that faces away from what is the impinging-flow side during operation, with the air flaps in the closed position.
Figure 2:
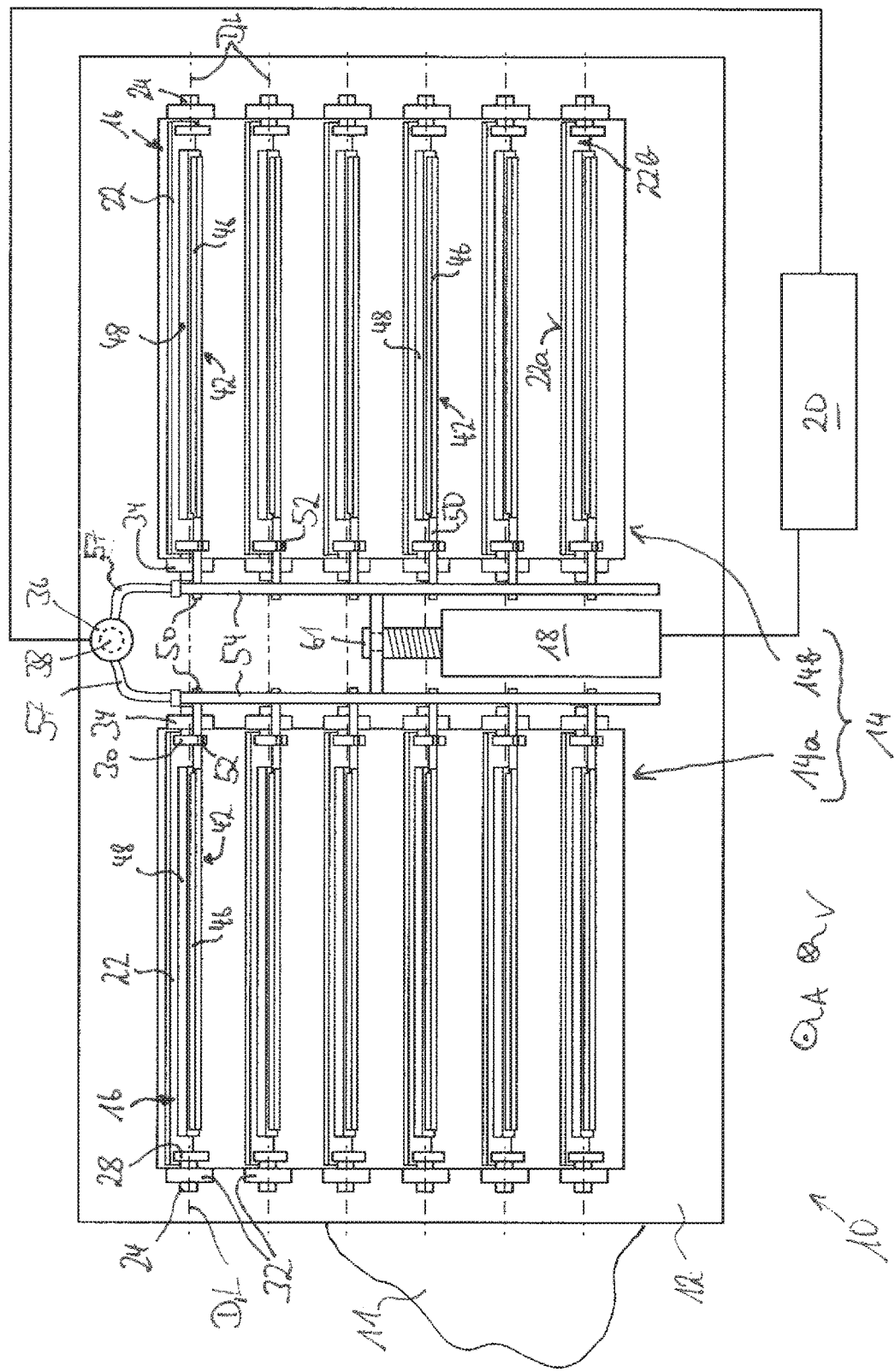
FIG. 2 is the view of FIG. 1 with the air flaps in the open position.

Referring now to the drawings wherein the showings are for the purpose of illustrating preferred and alternative embodiments of the invention only and not for the purpose of limiting the same, FIGS. 1 and 2 show an embodiment according to the present invention of an air flap apparatus for a vehicle that is labeled in general as 10. Air flap apparatus 10 encompasses a frame 12 that is embodied for mounting on a motor vehicle 11. Frame 12 comprises a passthrough opening 14 constituted from two passthrough sub-openings 14a and 14b. When viewed in the impinging flow direction that is orthogonal to the drawing plane of FIGS. 1 and 2, a plurality of substantially identical air flaps 16 are mounted, rotatably around rotation axes D, penetratingly through the respective flowthrough sub-openings 14a and 14b. In the interest of clarity, only individual air flaps 16 and rotation axes D are labeled with reference characters. It is nevertheless apparent that all the air flaps of the present Application are embodied as identical air flaps 16. Air flaps 16 that pass through flowthrough sub-opening 14b on the right in FIGS. 1 and 2 are arranged mirror-symmetrically with respect to air flaps 16 that pass through flowthrough sub-opening 14a on the left in FIGS. 1 and 2. In light of the symmetry condition that exists, it is therefore sufficient to describe in detail only one of air flaps 16, a description thereof likewise being applicable, given the aforesaid symmetry condition, to all the other air flaps 16 of air flap apparatus 10.

Air flap apparatus 10 furthermore encompasses a movement drive system 18 in the exemplifying form of a spindle drive, which can be activated to move by a control apparatus 20 of air flap apparatus 10.

An air flap 16 comprises an air flap blade 22 that is arranged eccentrically with respect to the respective rotation axis D. Rotation axis D of an air flap 16 is defined by bearing bolts 24 and 26 that project away from bearing bolt carriers 28 and 30 coaxially from the longitudinal center of air flap blade 22.

Bearing bolt carriers 28 and 30 in turn project from rear side 22b, not impinged upon by flow during operation, of air flap blade 22.

Bearing bolts 26 are visible only in FIGS. 2 and 3.

Bearing bolts 24 and 26 of an air flap 16 pass through associated bearing blocks 32 and 34 that are provided on frame 12 in order to mount air flaps 16. Air flap 16 is thus unequivocally defined in terms of its location relative to the frame, its rotation axis D in particular being unequivocally determined by bearing bolts 24 and 26 and unequivocally by bearing blocks 32 and 34 around which air flap 16 is displaceable between its closed position shown in FIG. 1 and its open position shown in FIG. 2. In the present example, the rotation axes of air flaps 16 are located behind (in impinging flow direction A) the segment in frame 12 which defines passthrough opening 14. The impinging flow direction is parallel to forward travel direction V of vehicle 11, but directed oppositely.

A light source 38 in the form of an LED arrangement is received on frame 12 in a receiving chamber 36. Light source 38 supplies light to light guides that will be described in further detail below.

As depicted in FIG. 3, air flap 16 comprises an aperture 40 that passes completely through air flap blade 22 between its front side 22a impinged upon by flow during operation, and its rear side 22b. Arranged in this aperture 40, as depicted in FIG. 3, is a flap light guide 42 whose operationally intended light emergence surface 42a faces toward the external environment of air flap 16, specifically through aperture 40 toward the front side of air flap apparatus 10 and of vehicle 11 that is carrying it.

In order to achieved particularly wide scattering of the light emerging from light emergence surface 42a of flap light guide 42, there is provided on light emergence surface 42a of flap light guide 42 an optical diffuser arrangement 44 that has a light-scattering surface topology on its light emergence surface 44a.

Light emergence surface 42a of flap light guide 42 is provided on an emergence segment 46 that projects into recess 40 of air flap blade 22.

Air flap blade 22 comprises, on its rear side 22b facing away from front side 22a impinged upon by flow, an enclosure 48 that completely peripherally surrounds both an end region, comprising light emergence surface 42a, of emergence segment 46 of flap light guide 42, and a segment of optical diffuser apparatus 44.

Enclosure 48, like air flap blade 22, is also manufactured from light-tight material, preferably by injection molding of a thermoplastic material.

Enclosure 48 prevents scattered light, undesirably emerging laterally from emergence segment 46, from being visible through passthrough opening 14 from outside vehicle 11 when air flap apparatus 10 is open.

Adjoining emergence segment 46 of flap light guide 42 is an optical coupling segment 50 that projects from emergence segment 46 along longitudinal axis L of air flaps 16 which coincides with rotation axis D.

Optical coupling segment 50 is received, without mechanical clearance, in a groove 52 of bearing bolt carrier 30 that carries bearing bolts 26, so that force and torque are transferable from optical coupling segment 50 to air flap 16.

Optical coupling segment 50 projects into a connecting strut 54 constituted from light guide material and passes through it, such that connecting strut 54 made of light guide material constitutes, with its aperture 56 passed through by optical coupling segment 50, a counterpart optical coupling segment of connecting strut 54. Connecting strut 54 thus constitutes a frame light guide 54 retained in movably guided fashion on frame 14.

The two connecting struts or frame light guides 54 shown in FIGS. 1 and 2 are connected to light source 38 via flexible light guides 57 that can be constituted from bendable glass-fiber bundles. Each of the two frame light guides 54 comprises at its one longitudinal end an introduction segment 58 at which light transfer from flexible light guides 57 to frame light guides 54 occurs. The frame light guides can thus always, regardless of their operating position, transfer light from light source 38 via flexible light guides 57, introduction segment 58, counterpart optical coupling segment 56, and optical coupling segment 50 to flap light guides 46 and thus to optical diffusion apparatuses 44, and radiate it to the front side of the respective air flaps 16.

Frame light guides 54, which are also connecting struts 54 and which couple air flaps 16 of a flowthrough sub-opening 14a or 14b for pivoting movement together around the respective rotation axes D, are coupled to drive spindle 61 of movement drive system 18.

Control apparatus 20 operates both movement drive system 18 and light source 38, so that the light emission of air flap apparatus 10 through optical diffusion apparatuses 44 is controllable as a function of the operation of movement drive system 18, but does not need to be controlled as a function of its operation.

Light source 38 can be modifiable as to color and/or as to brightness, i.e. dimmable.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. An air flap apparatus for a motor vehicle comprising a frame having a flowthrough opening, the air flap apparatus further comprising at least one air flap mounted movably relative to the frame, protrudingly into the flowthrough opening or penetratingly therethrough, the at least one air flap being displaceable between a closed position and an open position in order to modify a gas quantity flowing per unit time through the flowthrough opening in the context of a predefined impinging flow, the at least one air flap decreasing a flowthrough-capable cross section of the flowthrough opening more greatly in the closed position than in the open position, the air flap apparatus further including a movement drive system that is coupled in movement- and force-transferring fashion to the at least one air flap in order to drive the at least one air flap to move between the closed position and the open position, one or more air flaps of the at least one air flap of the air flap apparatus being a light-emitting air flap comprising a flap light guide having a light emergence surface through which light transferred in the flap light guide can emerge to an associated external environment of the one or more light-emitting air flap, wherein a frame light guide, which is coupled in light-transferring fashion to the flap light guide of the one or more light-emitting air flap, is retained on the frame.

2. The air flap apparatus according to claim 1, wherein the flap light guide of the one or more light-emitting air flap comprises an optical coupling segment that is coupled in light-transferring fashion to a counterpart optical coupling segment of the frame light guide.

3. The air flap apparatus according to claim 2, wherein the frame light guide comprises, at a distance from the counterpart optical coupling segment, an introduction segment that is embodied for introduction of light into the frame light guide.

4. The air flap apparatus according to claim 1, further comprising a light source that is in light-transferring communication with the frame light guide in such a way that light emitted from the light source is transferrable by the frame light guide.

5. The air flap apparatus according to claim 4, wherein the light source includes at least one LED.

6. The air flap apparatus according to claim 4, further comprising a control apparatus that is embodied to control both the operation of the movement drive system and the operation of the light source.

7. The air flap apparatus according to claim 6, wherein the control apparatus is embodied to operate the light source as a function of an operating state of the movement drive system.

8. The air flap apparatus according to claim 6, wherein the control apparatus is received together with the movement drive system in one housing.

9. The air flap apparatus according to claim 6, wherein the control apparatus is received together with the movement drive system in one housing and is embodied as a combined controller/actuator subassembly.

10. The air flap apparatus according to claim 1, wherein the one or more light-emitting air flap is a plurality of light-emitting air flaps that each comprise a flap light guide having a light emergence surface, the flap light guides being coupled in light-transferring fashion to the frame light guide.

11. The air flap apparatus according to claim 10, wherein the frame light guide contributes to the constitution of a coupling component that couples the plurality of light-emitting air flaps for movement together between the closed position and the open position, or is the coupling component.

12. The air flap apparatus according to claim 1, wherein the one or more light-emitting air flap comprises, on its front side impinged upon by flow during operation as intended, an aperture through which light is radiatable from the flap light guide to the associated external environment of the light-emitting air flap.

13. The air flap apparatus according to claim 12, wherein the one or more light-emitting air flap comprises, on its rear side located oppositely from the front side impinged upon by flow during operation as intended, an enclosure that covers, on more than two sides, at least one of the flap light guide and a diffuser apparatus coupled in light-transferring fashion thereto.

14. The air flap apparatus according to claim 1, wherein the one or more light-emitting air flap is a plurality of light-emitting air flaps that are arranged on the frame successively to one another along a succession axis, the air flap apparatus additionally comprising a plurality of flow-directing surfaces that are mounted on the frame immovably relative thereto and project into or pass through the flowthrough opening.

15. An air flap apparatus for a motor vehicle comprising a frame having a flowthrough opening, the air flap apparatus further comprising at least one air flap mounted movably relative to the frame, protrudingly into the flowthrough opening or penetratingly therethrough, the at least one air flap being displaceable between a closed position and an open position in order to modify a gas quantity flowing per unit time through the flowthrough opening in the context of a predefined impinging flow, the at least one air flap decreasing a flowthrough-capable cross section of the flowthrough opening more greatly in the closed position than in the open position, the air flap apparatus further including a movement drive system that is coupled in movement- and force-transferring fashion to the at least one air flap in order to drive the at least one air flap to move between the closed position and the open position, one or more air flaps of the at least one air flap of the air flap apparatus being a light-emitting air flap comprising a flap light guide having a light emergence surface through which light transferred in the flap light guide can emerge to an associated external environment of the one or more light-emitting air flap, wherein the one or more light-emitting air flap comprises an optical diffuser apparatus that is coupled in light-transferring fashion to the light emergence surface of the flap light guide.

16. The air flap apparatus according to claim 15, wherein the one or more light-emitting air flap comprises, on its front side impinged upon by flow during operation as intended, an aperture through which light is radiatable from the flap light guide to the associated external environment of the light-emitting air flap.

17. The air flap apparatus according to claim 15, wherein the one or more light-emitting air flap is a plurality of light-emitting air flaps that are arranged on the frame successively to one another along a succession axis, the air flap apparatus additionally comprising a plurality of flow-directing surfaces that are mounted on the frame immovably relative thereto and project into or pass through the flowthrough opening.

18. An air flap apparatus for a motor vehicle comprising a frame having a flowthrough opening, the air flap apparatus further comprising at least one air flap mounted movably relative to the frame, protrudingly into the flowthrough opening or penetratingly therethrough, the at least one air flap being displaceable between a closed position and an open position in order to modify a gas quantity flowing per unit time through the flowthrough opening in the context of a predefined impinging flow, the at least one air flap decreasing a flowthrough-capable cross section of the flowthrough opening more greatly in the closed position than in the open position, the air flap apparatus further including a movement drive system that is coupled in movement- and force-transferring fashion to the at least one air flap in order to drive the at least one air flap to move between the closed position and the open position, one or more air flaps of the at least one air flap of the air flap apparatus being a light-emitting air flap comprising a flap light guide having a light emergence surface through which light transferred in the flap light guide can emerge to an associated external environment of the one or more light-emitting air flap, wherein the one or more light-emitting air flap comprises, on its front side impinged upon by flow during operation as intended, an aperture through which light is radiatable from the flap light guide to the associated external environment of the light-emitting air flap, wherein the one or more light-emitting air flap comprises, on its rear side located oppositely from the front side impinged upon by flow during operation as intended, an enclosure that at least partly covers, on at least two sides, at least one of the flap light guide and a diffuser apparatus coupled in light-transferring fashion thereto.

19. The air flap apparatus according to claim 18, wherein the one or more light-emitting air flap is a plurality of light-emitting air flaps that are arranged on the frame successively to one another along a succession axis, the air flap apparatus additionally comprising a plurality of flow-directing surfaces that are mounted on the frame immovably relative thereto and project into or pass through the flowthrough opening.

20. The air flap apparatus according to claim 18, wherein the one or more light-emitting air flap comprises, on its rear side located oppositely from the front side impinged upon by flow during operation as intended, an enclosure that covers, on more than two sides, at least one of the flap light guide and a diffuser apparatus coupled in light-transferring fashion thereto.

* * * * *